United States Patent
Prasad

(10) Patent No.: US 7,118,790 B2
(45) Date of Patent: Oct. 10, 2006

(54) PROCESS FOR PRODUCING COATED POLYMERIC ARTICLES AND THE ARTICLES PRODUCED THEREBY

(75) Inventor: Ravi Prasad, Charlotte, NC (US)

(73) Assignee: Hoechst Trespaphan, Neunkirchen (DE)

( * ) Notice: Subject to any disclaimer, the term of this patent is extended or adjusted under 35 U.S.C. 154(b) by 0 days.

(21) Appl. No.: 10/663,934

(22) Filed: Sep. 16, 2003

(65) Prior Publication Data

US 2004/0043173 A1 Mar. 4, 2004

Related U.S. Application Data

(63) Continuation of application No. 09/135,228, filed on Aug. 17, 1998, now Pat. No. 6,649,235.

(51) Int. Cl.
*B32B 17/10* (2006.01)

(52) U.S. Cl. ............ 428/35.7; 428/441; 428/451; 428/910; 156/106; 264/510; 264/514; 264/515

(58) Field of Classification Search ......... 428/34.7, 428/441, 451, 910; 156/106; 264/510, 514–515
See application file for complete search history.

(56) References Cited

U.S. PATENT DOCUMENTS

| | | | |
|---|---|---|---|
| 3,433,777 A | 3/1969 | Brunson | |
| 3,442,686 A * | 5/1969 | Jones | 428/336 |
| 4,198,327 A | 4/1980 | Matsumoto et al. | |
| 4,247,576 A | 1/1981 | Kutner | |
| 4,503,158 A | 3/1985 | Richard | |
| 4,552,714 A * | 11/1985 | Krueger et al. | 264/173.14 |
| 4,561,920 A | 12/1985 | Foster | |
| 4,650,721 A | 3/1987 | Ashcraft et al. | |
| 4,675,210 A | 6/1987 | Clayton et al. | |
| 4,762,882 A | 8/1988 | Okano et al. | |
| 4,908,339 A * | 3/1990 | Blount | 501/32 |
| 4,957,968 A * | 9/1990 | Adur et al. | 525/74 |
| 5,087,677 A | 2/1992 | Brekner et al. | |
| 5,153,074 A | 10/1992 | Migliorini | |
| 5,192,620 A | 3/1993 | Chu et al. | |
| 5,360,862 A | 11/1994 | Roberts | |
| 5,368,894 A | 11/1994 | Lammers et al. | |
| 5,451,455 A | 9/1995 | Peiffer et al. | |
| 5,491,023 A | 2/1996 | Tsai et al. | |
| 5,741,594 A * | 4/1998 | Jialanella | 428/424.2 |
| 5,853,830 A | 12/1998 | McCaulley | |
| 5,882,798 A | 3/1999 | Hubbard et al. | |
| 5,925,428 A | 7/1999 | Hubbard et al. | |
| 6,013,128 A | 1/2000 | Hubbard et al. | |
| 6,051,296 A | 4/2000 | McCaulley et al. | |
| 6,071,624 A | 6/2000 | Hubbard et al. | |
| 6,086,991 A | 7/2000 | Hubbard et al. | |
| 6,254,994 B1 | 7/2001 | Hubbard et al. | |
| 6,368,677 B1 | 4/2002 | Hubbard et al. | |
| 6,649,235 B1 | 11/2003 | Prasad | |

FOREIGN PATENT DOCUMENTS

| | | |
|---|---|---|
| EP | 317 358 A2 | 5/1989 |
| GB | 2289864 A | 12/1995 |
| WO | WO97/44379 A | 11/1997 |
| WO | WO97/47678 A | 12/1997 |
| WO | WO97/47694 A | 12/1997 |
| WO | WO97/47695 A | 12/1997 |

OTHER PUBLICATIONS

Mark Alger, 1997, Polymer Science Dictionary, 2$^{nd}$ edition, pp. 520,521.*

Patent Abstracts of Japan, vol. 1998, No. 2, Jan. 30, 1998 & JP 09277425 A (Toppan Printing Co. Limited), Oct. 28, 1997 (Abstract).

Database WPI, Section Ch, Week 197936, Derwent Publications Ltd., London, GB; AN 1979-65444B XP002127008 & JP 54 094584 A (Tamapoly KK), Jul. 26, 1979 (abstract).

Database WPI, Section Ch, Week 198652, Derwent Publications Ltd., London, GB; AN 1986-341854 XP002127007 & JP 61 254344 a (Mitsubishi Petrochemical Co., Ltd.), Nov. 12, 1986 (Abstract).

* cited by examiner

*Primary Examiner*—Harold Pyon
*Assistant Examiner*—Sow-Fun Hon
(74) *Attorney, Agent, or Firm*—Howson & Howson

(57) ABSTRACT

A method for producing a coated polymeric article by co-extruding polypropylene and a maleic anhydride modified polypropylene, corona-treating, and applying a polysilicate barrier is described. Also provided are films and bottles produced using this method.

11 Claims, No Drawings

PROCESS FOR PRODUCING COATED POLYMERIC ARTICLES AND THE ARTICLES PRODUCED THEREBY

CROSS-REFERENCE TO RELATED APPLICATION

This is a continuation of U.S. patent application Ser. No. 09/135,228, filed Aug. 17, 1998, now U.S. Pat. No. 6,649,235.

BACKGROUND OF THE INVENTION

The present invention relates generally to the production of coated polymeric articles, and particularly, articles with barrier coatings.

Polymeric articles, including films and bottles, are widely used for packaging products, particularly foods. No unmodified polymeric article, however, has the gas and moisture barrier characteristics needed for packaging.

Thus, multilayer polymeric films have been designed with have improved gas and moisture barrier properties. For example, in U.S. Pat. No. 5,192,620 (Chu et al), a polypropylene film is coated with a blend of an ethylene-acrylic acid copolymer and polyvinyl alcohol and then metalized to produce a film with moisture barrier properties. U.S. Pat. No. 5,491,023 describes the application of a layer of polyvinylalcohol to the surface of a polyolefin substrate which has been modified by a maleic anhydride modified polypropylene.

Unfortunately, certain of the layers which have been applied to polymeric films in order to improve gas and moisture barrier properties have been faced with problems with adhering to the substrate. Various approaches have been taken to address these problems. However, to date, none of these approaches has provided a product with adequate barrier properties, which may be efficiently produced.

SUMMARY OF THE INVENTION

In one aspect, the present invention provides a process for making a coated polymeric article. The process involves co-extruding a selected polyolefin and a maleic anhydride modified polyolefin, thereby producing a polymeric substrate having a modified maleic anhydride surface. The maleic anhydride surface of the polymeric substrate is surface treated and the polysilicate barrier coating applied to the treated polymeric substrate.

In another aspect, the process of the invention further involves biaxially orienting the substrate prior to application of the barrier coating.

In another aspect, the present invention provides a coated polymeric article comprising a substrate consisting of coextruded maleic anhydride modified polypropylene and a selected polyolefin and a polysilicate coating on the surface of the coextruded substrate.

Other aspects of the present invention will be apparent from a review of the detailed description of the invention.

DETAILED DESCRIPTION OF THE INVENTION

The present invention provides a method of producing a polymeric article with a barrier coating. Advantageously, the method of the invention enables good adhesion of the barrier coating to the substrate without separate application of a primer layer (e.g., a solvent coating) to the substrate. Thus, the method of the invention also provides advantageous in production of the coated articles.

In one aspect, the present invention provides a method for making a coated polymeric article by co-extruding a selected polyolefin and a modified polyolefin. Suitably, the modified polyolefin is hydrophilic. Most suitably, the modified polyolefin is, prior to modification, the same as the selected unmodified polyolefin. In a preferred embodiment, the polyolefin is a polypropylene homopolymer or copolymer. However, other suitable polyolefins may be readily selected. Examples of other suitable polyolefins include, without limitation, polyethylene, polyesters, polybutene, polycarbonate, polyacrylonitrile, and olefin copolymers, including cycloolefin copolymers (COC), such as a copolymer of ethylene and norbornene [U.S. Pat. No. 5,087,677].

Preferably, the modified polyolefin is a maleic anhydride modified polypropylene. The maleic anhydride modified polypropylene can be prepared by any process, for example, the process described in U.S. Pat. No. 3,433,777, U.S. Pat. No. 4,198,327, or U.S. Pat. No. 5,153,074. One commercially available maleic anhydride modified polypropylene or propylene copolymer has the following physical characteristics: density of 0.90 (ASTM D1505), Vicat softening point of 143° C. (ASTM D1525); Shore hardness of 67° C. (ASTM 2240) and a melting point of 160° C. (ASTM D2117). Alternatively, these modified polyolefins may be produced by other means or purchased commercially (e.g., from Uniroyal (Polybond brand), Mitsui (Attmar brand), or Dow (Primacor brand)).

The polyolefin and hydrophilic modified polyolefin are co-extruded using conventional means. For example, suitable temperatures of extrusion are in the range of 180–240° C., and the resulting co-extruded substrate has a thickness in the range of 20–50 mil thick. Suitable means include the use of a selector plug or multicavity die. The resulting polymeric substrate is provided with a layer of modified polyolefin and a layer of unmodified polyolefin. This modified polyolefin layer is pre-treated prior to application of the barrier coating. Preferably, this pretreatment involves surface treatment to permit the barrier coating to adhere. Suitable surface treatments are well known in the art and include corona treatment, flame treatment, plasma treatment, chemical treatment or corona discharge treatment. Most desirably, the surface is treated to raise the surface energy to about 45 to about 60 dynes/cm in accordance with ASTM Standard D2578-84.

Optionally, the polymeric substrate may be oriented prior to treatment and application of the barrier coating. Desirably, the substrate is biaxially oriented by sequential stretching. For example, the substrate may be stretched up to 5 times in the machine direction and up to 10 times in the transverse direction, such that a thickness in the range of about 0.5 mil to about 2 mil, and in one desirable embodiment, 0.75 mil is achieved.

Suitably, the barrier coating is an inorganic coating, and preferably, a polysilicate coating. Suitable polysilicate coatings may be readily selected from among those known in the art.

An example of one suitable coating is described in WO 97/47694 (Dec. 18, 1997), which describes a vapor barrier coating solution containing a layered inorganic mineral filler dispersed in an inorganic binder. Preferably, the filler is a layered inorganic mineral and the binder is an alkali metal polysilicate. The weight fraction of layered inorganic filler in the inorganic components of the dried coating is from 0 to 99%. Suitable inorganic minerals are selected from among phyllosilicates, illite minerals, and layered double hydroxides. Most preferably, the layered material is vermiculite. Suitable binders include metal polysilicates selected from lithium polysilicate, sodium polysilicate, potassium polysilicate and copolysilicate blends thereof.

Another suitable polysilicate coating is described in WO 97/44379 (Nov. 27, 1997), which describes lithium-potassium copolysilicates of the formula $(Li_2O)_x(K_2O)_{1-x}(SiO_x)_y$, in which the mole fraction of $Li_2O$ is x, the molar ratio of $SiO_2$ to $M_2O$ is y, and $M_2O$ is $(Li_2O)_x(K_2O)_{1-x}$. In this co-polysilicate, y is between 1 and 10, if x is less than about 1. Desirably, x ranges from approximately 0.5 to less than 1 and y ranges from 1 to approximately 10. Most preferably, x ranges from 0.5 to less than 1 and y is greater than 4.6 and may have a value up to about 10. These coatings typically contain up to about 25%, by weight solids. However, this percentage may be adjusted as needed.

Still another suitable inorganic coating is described in WO 97/47695 (Dec. 18, 1997). This publication describes a vapor barrier coating solution containing a metal polysilicate and transparent noncrystalline titanium dioxide ($TiO_2$), which is particularly well suited for coating poly(ethylene terephthalate) polymeric articles. The metal polysilicates are defined essentially as defined as in WO 97/44379. Suitably, the nanocrystalline titanium dioxide is present in an amount up to about 25 weight percent of the total solids in the solution. Preferably, the titanium dioxide makes up about 2 to about 9 percent by weight of the total solids. Suitably, the noncrystalline titanium dioxide has an average particle size of less than about 100 nm, and preferably less than about 50 nm. Either of the two commercially available crystal forms of titanium dioxide, anatase and rutile, may be utilized.

Still other suitable polysilicate coatings may be readily selected by one of skill in the art.

Thus, the polysilicate coatings useful in the invention are desirably alkali metal polysilicates selected from aqueous lithium polysilicate, sodium polysilicate, or potassium polysilicate and copolysilicate blends of these materials. An exemplary commercially available product bearing the trademark Inobond® Li 2043 (van Baerle & Cie) is an aqueous colloidal suspension of lithium polysilicate which contains ~24.5 percent by weight silicon oxide and ~3 percent by weight lithium oxide. Another useful product is available from van Baerle & Cie under the trademark K-4009 and is an aqueous colloidal suspension of potassium polysilicate which contains ~26.8 percent by weight silicon oxide and ~13 percent by weight potassium oxide. Such components are mixed with water to produce a desired solids content for a coating solution useful in this invention. Following a period of stirring, the barrier coating mixture is ready to be applied to a polymeric substrate prepared as described herein.

The barrier coating may be applied directly to the treated polymeric substrate by any suitable technique. These techniques include, without limitation, roll coating, spray coating, and dip coating techniques. Coventional roll coating techniques include, without limitation, rod, roll, reverse roll, forward roll, air knife, knife over roll, blade, gravure and slot die coating methods. General descriptions of the types of coating methods may be found in texts, such as *Modern Coating and Drying Techniques,* (E. Cohen and E. Gutoff, eds; VCH Publishers) New York (1992) and *Web Processing and Converting Technology and Equipment,* (D. Satas, ed; Van Nostrand Reinhold) New York (1984). Three-dimensional articles may be coated by spray coating or dip coating. The method of application is not a limitation on the present invention, but may be selected from among these and other known methods by a person of skill in the art.

After coating, the coated product is dried at a selected temperature of room temperature or greater than room temperature. The selection of the drying temperature depends on the desired time for drying; this, accelerated drying times may be achieved at elevated temperatures which would not be necessary if a longer time period for drying was acceptable. One of skill in the art can readily adjust the oven temperature and drying time as desired. The performance of the dried vapor barrier coating is insensitive to the drying temperature over the range 25–200° C.

The method of the invention permits polysilicate coating having a thickness ranging from about 200 to about 500 nm to be applied to the polymeric substrate. However, it is anticipated that the method of the invention will permit coatings of a thickness in excess of 500 nm. The resulting coated article is therefore provided with better oxygen and moisture barrier properties than articles produced by other methods.

Optionally, protective top coats may be adhesively laminated or applied by other suitable means over the oxygen barrier coating layer described above. These top coats may provide further oxygen barrier properties or other desirable properties, e.g., increased moisture barrier characteristics. The top-coat may be either a thin (typically, but not necessarily, 1–10 thick) coating or a laminated film. Thin top-coatings may be applied by a variety of coating methods: roll coating, spray coating, dip coating. Currently, when utilizing roll coating, it is preferable to use line speeds below 800 feet per minute, and most desirably, below about 500 feet per minute. Laminates may be prepared by melt-extrusion lamination over the barrier coating or by adhesive lamination of a second film. The laminate offers protection to flexing; performance does not degrade as much when the surface is laminated. The top-coat further provides improved flex resistance, i.e., retention of vapor barrier performance after flexing, and moisture resistance, i.e., retention of vapor barrier performance at high relative humidity.

Suitably, these topcoats are water-soluble. Most preferably, these topcoats are suitable for use over coatings of flexible substrates which are to be used in connection with food packaging. See, e.g., the materials described in 21 CFR §175.210 et seq., incorporated by reference herein. Suitable topcoats may be readily selected by one of skill in the art. Currently, preferred topcoat materials are selected from among polymethyacrylate, cellulose acetate, and cellulose nitrate. However, examples of other suitable laminates include oriented polypropylene (OPP), including metallized OPP. Commercially available oriented OPP is available from Mobil Chemical, Films Division Bicor 70MB-HB.

In another aspect, the present invention provides coated articles produced by the methods of the invention. These articles are preferably films, and most preferably, biaxially oriented polypropylene films. However, other coated articles, including bottles, plastic containers, jars, blister-packs, and lidstocks may be readily produced using the method of the invention. In a preferred embodiment, the articles are films or bottles used for food storage.

Thus, the invention provides a coated polymeric article made up of a substrate consisting of coextruded maleic anhydride modified polypropylene and a selected polyolefin and a polysilicate coating on the surface of the coextruded substrate. The coated polymeric articles of the invention are provided with a better oxygen barrier than previous articles made with polysilicate coatings.

The following examples are provided to illustrate the invention and do not limit the scope thereof. One skilled in the art will appreciate that although specific reagents and conditions are outlined in the following examples, modifications can be made which are meant to be encompassed by the spirit and scope of the invention.

EXAMPLE 1

Control Film

A polypropylene film was made by co-extruding polypropylene homopolymer together with polypropylene-polyethylene co-polymer on one side. This film was stretched approximately 4–5 times in the machine direction at 120° C. followed by transverse direction stretch of approximately 9–10 at 174 ° C.

A barrier coating of a lithium-potassium copolysilicate, $(Li_2O)_x(K_2O)_{1-x}(SiO_2)_y$, was prepared using conventional protocols. For this copolysilicate solution, the total solids level was 12% by weight and the mole fraction of $Li_2O$, x, and the mole ratio, y, of $SiO_2$ to the combined alkali metal oxides are 0.5 and 3.64, respectively. The lithium polysilicate used was Inobond® Li 2043 lithium polysilicate solution (van Baerle) having 3.0% w/w $Li_2O$ and 24.5% w/w $SiO_2$. The potassium polysilicate used was K-4009 potassium silicate solution (van Baerle) having 13.0% w/w $K_2O$ and 26.85% w/w $SiO_2$. With continuous stirring, Inobond® Li 2043 solution, 53.1 g was diluted with distilled water, 108.1 g, followed by addition of K-4009 polysilicate, 38.8 g.

This film was corona treated on the homopolymer and coated with the lithium-potassium copolysilicate barrier material using a roll coating process (gravure) to coat the film to a dried thickness of 0.5µ of the coating.

The Oxygen transmission rate (OTR) of this coated film was found to be 900–1000 cc/m²/day at 1 bar, 23° C. and 50% Relative Humidity.

EXAMPLE 2

A polypropylene film was made by co-extruding polypropylene homopolymer together with polypropylene-polyethylene co-polymer on one side and polypropylene modified by grafting acrylic acid functionality (POLYBOND 1002, Uniroyal) on the other side of the homopolymer layer. This film was stretched approximately 4–5 times in the machine direction at 120° C. followed by transverse direction stretch of approximately 9–10 times at 174° C. This film was corona treated on the modified polypropylene side and coated with the lithium-potassium co-polysilicate barrier material described in Example 1 above. The OTR of this film was found to be 700–850 cc/m²/day at 1 bar, 23° C. and 50% Relative Humidity.

EXAMPLE 3

A polypropylene film was made by co-extruding polypropylene homopolymer together with polypropylene-polyethylene co-polymer on one side and ethylene vinyl alcohol (SOARNAL) on the other side of the polypropylene homopolymer layer. This film was stretched approximately 4–5 times in the machine direction at 120° C. followed by transverse direction stretch of approximately 9–10 times at 174° C. The SOARNOL layer could not be stretched and appeared as a shredded layer on top of the homopolymer layer. This film was not coatable. The inventor believes that this result was observed because an attempt was made to stretch the vinyl alcohol component more than approximately 5–6 times. This coating is suitable for films which require fewer orientation steps and for films and other substrates which do not require orientation.

EXAMPLE 4

A polypropylene film was made by co-extruding polypropylene homopolymer together with polypropylene-polyethylene co-polymer on one side and polypropylene modified by grafting maleic anhydride groups (POLYBOND EXP 97-60-35, Uniroyal) on the other side of the polypropylene homopolymer layer. This film was stretched approximately 4–5 times in the machine direction at 120° C. followed by transverse direction stretch of approximately 9–10 times at 174° C. This film was corona treated on the modified polypropylene side and coated with the lithium-potassium co-polysilicate barrier material described in Example 1.

The OTR of this film was found to be 3–15 cc/m²/day at 1 bar, 23° C. and 50% Relative Humidity.

All publications cited in this specification are incorporated herein by reference herein. While the invention has been described with reference to a particularly preferred embodiment, it will be appreciated that modifications can be made without departing from the spirit of the invention. Such modifications are intended to fall within the scope of the appended claims.

What is claimed is:

1. A coated polymeric article comprising a film comprising:
   (a) a coextruded polypropylene substrate consisting of a first outer surface of a maleic anhydride modified polypropylene layer and a second outer surface of a selected polypropylene layer; and
   (b) a polysilicate coating on the maleic anhydride modified polypropylene layer,
   wherein component (a) is stretched approximately 4 to 5 times in the machine direction, followed by transverse stretching approximately 9 to 10 times, such that a thickness of component (a) in the range of about 0.5 to about 2 mil was achieved prior to coating;
   and wherein said coated polymeric article has an oxygen transmission rate of 3 to 15 cc/m²/day at 1 bar, 23° C. and 50% relative humidity.

2. The coated article according to claim 1, wherein said article further comprises a top coat.

3. The coated article according to claim 2, wherein the top coat is selected from the group consisting of polymethacrylate, cellulose acetate, and cellulose nitrate.

4. The article according to claim 1, wherein the article is a bottle.

5. The article according to claim 1, wherein said polysilicate coating has a thickness ranging from about 200 to about 500 nm.

6. The article according to claim 1, wherein said polysilicate coating comprises a lithium polysilicate.

7. The article according to claim 1, wherein said polysilicate coating comprises a lithium-potassium copolysilicate.

8. The article according to claim 1, wherein the article is selected from the group consisting of bottles, jars, lidlocks and blister packs.

9. A coated polymeric film comprising:
(a) a coextruded polypropylene substrate consisting of a first outer surface of a maleic anhydride modified polypropylene layer and a second outer surface of a selected polypropylene layer; and
(b) a polysilicate coating on the maleic anhydride modified polypropylene layer, wherein component (a) is stretched approximately 4 to 5 times in the machine direction, followed by transverse stretching approximately 9 to 10 times, such that a thickness of component (a) in the range of about 0.5 to about 2 mil was achieved prior to coating;

and wherein said coated polymeric film has an oxygen transmission rate of 3 to 15 cc/m$^2$/day at 1 bar, 23° C. and 50% relative humidity.

10. The film according to claim 9, wherein said polysilicate coating has a thickness ranging from about 0.5 µm.

11. The film according to claim 9, wherein said polysilicate coating comprises a lithium-potassium copolysilicate.

* * * * *